(12) United States Patent
Colston

(10) Patent No.: US 10,764,423 B2
(45) Date of Patent: *Sep. 1, 2020

(54) CLOUD SYSTEM FOR CONTROLLING OUTDOOR GRILL WITH MOBILE APPLICATION

(71) Applicant: Traeger Pellet Grills, LLC, Salt Lake City, UT (US)

(72) Inventor: Michael Colston, Salt Lake City, UT (US)

(73) Assignee: Traeger Pellet Grills, LLC, Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/432,842

(22) Filed: Jun. 5, 2019

(65) Prior Publication Data
US 2019/0320058 A1 Oct. 17, 2019

Related U.S. Application Data

(63) Continuation-in-part of application No. 16/193,235, filed on Nov. 16, 2018, and a continuation-in-part of (Continued)

(51) Int. Cl.
*H04M 1/00* (2006.01)
*H04M 1/725* (2006.01)
(Continued)

(52) U.S. Cl.
CPC ....... *H04M 1/72533* (2013.01); *A47J 36/321* (2018.08); *G08C 17/02* (2013.01);
(Continued)

(58) Field of Classification Search
CPC . H04M 1/72533; H04W 4/80; H04W 68/005; A47J 36/321; G08C 17/02;
(Continued)

(56) References Cited

U.S. PATENT DOCUMENTS 3,448,679 A 6/1969 Holka et al.
4,036,995 A 7/1977 Koether et al.
(Continued)

FOREIGN PATENT DOCUMENTS

CN 202392848 U 8/2012
CN 203914599 U 11/2014
(Continued)

OTHER PUBLICATIONS

SmartThings, "Easy & Affordable Smart Home Automation" retrieved from http://www.smartthings.com on Feb. 26, 2018, 5 pages.
(Continued)

*Primary Examiner* — Khai M Nguyen
(74) *Attorney, Agent, or Firm* — TraskBritt

(57) ABSTRACT

Embodiments are directed to communicating with and controlling operation of electronically-controlled appliances. In one scenario, a computer system receives a first input from a computing system indicating that an electronically-controlled appliance is permitted to communicate with a cloud computing platform. The computer system generates a notification that is to be sent to a software application, where the software application is configured to control functions of the electronically-controlled appliance. The computer system transmits the generated notification to the software application, where the generated notification indicates that the cloud computing platform is communicably connected to the electronically-controlled appliance. The computer system then receives a second input from the software application indicating that specified functions are to be performed on the electronically-controlled appliance, and transmits instructions to the electronically-controlled appliance to perform the specified functions. These functions are then interpreted and carried out by a hardware controller on the electronically-controlled appliance.

16 Claims, 7 Drawing Sheets

Related U.S. Application Data application No. 15/511,319, filed on Mar. 15, 2017, now Pat. No. 10,455,022, said application No. 16/193,235 is a continuation of application No. 15/510,996, filed on Mar. 13, 2017, now Pat. No. 10,218,833, application No. 16/432,842, which is a continuation-in-part of application No. 15/114,744, filed as application No. PCT/US2016/039271, filed as application No. PCT/US2016/026736, filed as application No. PCT/US2016/024737 on Mar. 29, 2016.

(60) Provisional application No. 62/245,530, filed on Oct. 23, 2015, provisional application No. 62/245,549, filed on Oct. 23, 2015, provisional application No. 62/245,535, filed on Oct. 23, 2015.

(51) Int. Cl.
| | | |
|---|---|---|
| *H04L 29/08* | (2006.01) | |
| *G08C 17/02* | (2006.01) | |
| *H04W 68/00* | (2009.01) | |
| *A47J 36/32* | (2006.01) | |
| *H04W 4/80* | (2018.01) | |
| *H04Q 9/00* | (2006.01) | |

(52) U.S. Cl.
CPC .............. *H04L 67/125* (2013.01); *H04Q 9/00* (2013.01); *H04W 4/80* (2018.02); *H04W 68/005* (2013.01); *G08C 2201/30* (2013.01); *G08C 2201/42* (2013.01); *G08C 2201/93* (2013.01)

(58) Field of Classification Search
CPC ............ G08C 2201/30; G08C 2201/42; G08C 2201/93; H04L 67/125; H04Q 9/00
See application file for complete search history.

(56) References Cited

U.S. PATENT DOCUMENTS

| | | |
|---|---|---|
| 4,409,662 A | 10/1983 | Rao |
| 4,474,107 A | 10/1984 | Cothran |
| 4,809,190 A | 2/1989 | Homer et al. |
| 4,837,414 A | 6/1989 | Edamula |
| 5,360,965 A | 11/1994 | Ishii et al. |
| 5,429,110 A | 7/1995 | Burke et al. |
| 6,257,227 B1 | 7/2001 | Harbin |
| 7,168,363 B1 | 1/2007 | Brown |
| D605,216 S | 12/2009 | Nakano |
| 7,663,502 B2 | 2/2010 | Breed |
| 7,703,389 B2 | 4/2010 | McLemore et al. |
| 7,707,606 B2 | 4/2010 | Hofrichter et al. |
| 7,743,012 B2 | 6/2010 | Chambers et al. |
| 7,937,484 B2 | 5/2011 | Julia et al. |
| 8,091,543 B2 | 1/2012 | Baumann et al. |
| 8,297,271 B2 | 10/2012 | Cedar et al. |
| 8,539,567 B1 | 9/2013 | Logue et al. |
| 8,730,038 B2 | 5/2014 | Durian |
| 8,766,144 B2 | 7/2014 | McLoughlin et al. |
| 8,855,793 B2 | 10/2014 | Bhargava et al. |
| 8,931,400 B1 | 1/2015 | Allen |
| 9,149,058 B2 | 10/2015 | Bilet et al. |
| 9,164,867 B2 | 10/2015 | Ebrom et al. |
| 9,210,192 B1 | 12/2015 | Kim et al. |
| 9,414,444 B2 | 8/2016 | Libman et al. |
| 9,451,031 B2 | 9/2016 | Graziano et al. |
| 9,497,572 B2 | 11/2016 | Britt et al. |
| 9,672,670 B2 | 6/2017 | Menkveld |
| 9,759,429 B2 * | 9/2017 | Tucker ................ A47J 37/0704 |
| 9,928,672 B2 | 3/2018 | Jablokov et al. |
| 10,158,720 B2 | 12/2018 | Colston |
| 10,187,494 B2 | 1/2019 | Stewart et al. |
| 10,218,833 B2 | 2/2019 | Colston |
| 10,388,141 B2 | 8/2019 | Allen, Sr. |
| 10,395,506 B2 | 8/2019 | Allen, Sr. |
| 2003/0015188 A1 | 1/2003 | Harbin |
| 2003/0120972 A1 | 6/2003 | Matsushima et al. |
| 2004/0182254 A1 | 9/2004 | Gershon |
| 2005/0034716 A1 | 2/2005 | Harbin |
| 2005/0262226 A1 | 11/2005 | Holloway et al. |
| 2006/0041655 A1 | 2/2006 | Holloway et al. |
| 2006/0144384 A1 | 7/2006 | Santagata |
| 2006/0254432 A1 | 11/2006 | McLemore |
| 2007/0001012 A1 | 1/2007 | Kim et al. |
| 2007/0012307 A1 | 1/2007 | Wiker et al. |
| 2007/0056577 A1 | 3/2007 | Chang |
| 2007/0067431 A1 | 3/2007 | Yoshihara et al. |
| 2007/0137537 A1 | 6/2007 | Drisdelle et al. |
| 2007/0180400 A1 | 8/2007 | Zotov et al. |
| 2007/0221205 A1 | 9/2007 | Landon |
| 2008/0060632 A1 | 3/2008 | Leverty |
| 2009/0000493 A1 | 1/2009 | Mosher, II |
| 2009/0006180 A1 | 1/2009 | Hameen-Anttila |
| 2010/0012165 A1 | 1/2010 | Bedard |
| 2010/0132692 A1 | 6/2010 | Shaffer |
| 2010/0134620 A1 | 6/2010 | Bielstein |
| 2010/0147823 A1 | 6/2010 | Anderson et al. |
| 2010/0247721 A1 | 9/2010 | McGhee et al. |
| 2010/0251973 A1 | 10/2010 | Dongo et al. |
| 2011/0002677 A1 | 1/2011 | Cochran et al. |
| 2012/0060819 A1 | 3/2012 | Hunt et al. |
| 2012/0089835 A1 | 4/2012 | Peckover |
| 2012/0116820 A1 | 5/2012 | English et al. |
| 2012/0170247 A1 | 7/2012 | Do |
| 2012/0204131 A1 | 8/2012 | Hoang et al. |
| 2012/0210268 A1 | 8/2012 | Hilbrink et al. |
| 2012/0278454 A1 | 11/2012 | Stewart et al. |
| 2012/0310416 A1 | 12/2012 | Tepper et al. |
| 2013/0061765 A1 | 3/2013 | Reinhart |
| 2013/0171304 A1 | 7/2013 | Huntley |
| 2013/0188097 A1 | 7/2013 | Smith |
| 2013/0265159 A1 | 10/2013 | Durian |
| 2013/0277353 A1 | 10/2013 | Joseph et al. |
| 2014/0081433 A1 | 3/2014 | Cheong et al. |
| 2014/0098247 A1 | 4/2014 | Rao et al. |
| 2014/0121786 A1 | 5/2014 | Chen et al. |
| 2014/0148969 A1 | 5/2014 | Graziano et al. |
| 2014/0150698 A1 | 6/2014 | Walker |
| 2014/0170275 A1 | 6/2014 | Bordin |
| 2014/0295822 A1 | 10/2014 | Koo et al. |
| 2014/0326233 A1 | 11/2014 | Traeger |
| 2014/0365018 A1 | 12/2014 | Kusukame et al. |
| 2015/0019342 A1 | 1/2015 | Gupta |
| 2015/0025687 A1* | 1/2015 | Henderson ............. A23B 4/052 700/275 |
| 2015/0056344 A1 | 2/2015 | Luckhardt |
| 2015/0081086 A1 | 3/2015 | Hallowell et al. |
| 2015/0134727 A1* | 5/2015 | Lee .................... H04L 12/2818 709/203 |
| 2015/0213711 A1 | 7/2015 | Rezvani et al. |
| 2015/0229713 A1 | 8/2015 | Lu et al. |
| 2015/0285513 A1 | 10/2015 | Matarazzi et al. |
| 2015/0304157 A1 | 10/2015 | Kim et al. |
| 2015/0330658 A1 | 11/2015 | Filson et al. |
| 2015/0346952 A1 | 12/2015 | Yang et al. |
| 2016/0037966 A1 | 2/2016 | Chin et al. |
| 2016/0051078 A1 | 2/2016 | Jenkins et al. |
| 2016/0072638 A1 | 3/2016 | Amer et al. |
| 2016/0080041 A1 | 3/2016 | Schultz et al. |
| 2016/0088049 A1 | 3/2016 | Seed et al. |
| 2016/0147207 A1 | 5/2016 | Park et al. |
| 2016/0191267 A1 | 6/2016 | Zhang et al. |
| 2016/0198885 A1 | 7/2016 | Logan et al. |
| 2016/0255999 A1 | 9/2016 | McAdams et al. |
| 2016/0274611 A1 | 9/2016 | Amer et al. |
| 2016/0327263 A1 | 11/2016 | Traeger |
| 2016/0335874 A1 | 11/2016 | Allen, Sr. |
| 2017/0020324 A1 | 1/2017 | Young et al. |
| 2017/0164783 A1 | 6/2017 | Sauerwein et al. |
| 2017/0176019 A1 | 6/2017 | Bhogal et al. |
| 2017/0289257 A1 | 10/2017 | Colston |

(56) References Cited

U.S. PATENT DOCUMENTS

| | | | |
|---|---|---|---|
| 2017/0289336 | A1 | 10/2017 | Colston |
| 2018/0125296 | A1 | 5/2018 | Gafford |
| 2018/0220099 | A1 | 8/2018 | Li |

FOREIGN PATENT DOCUMENTS

| | | | |
|---|---|---|---|
| CN | 204270170 U | | 4/2015 |
| DE | 102008043722 A1 | | 5/2010 |
| DE | 102012204229 | | 9/2013 |
| EP | 0298858 A1 | | 1/1989 |
| EP | 0899512 | | 3/1999 |
| JP | 2003-172578 A | | 6/2003 |
| JP | 2004-229266 A | | 8/2004 |
| JP | 2006-201994 A | | 8/2006 |
| JP | 2007-004579 A | | 1/2007 |
| JP | 2007-053530 A | | 3/2007 |
| JP | 2012-032949 A | | 2/2012 |
| JP | 2012-141658 A | | 7/2012 |
| JP | 2015-017711 A | | 1/2015 |
| KR | 10-2002-0036478 A | | 5/2002 |
| KR | 10-2014-0008927 A | | 1/2014 |
| KR | 10-1457087 B1 | | 10/2014 |
| KR | 10-2014-0135318 A | | 11/2014 |
| KR | 10-1534514 B1 | | 7/2015 |
| WO | 2012/171242 A1 | | 12/2012 |
| WO | 2014/086487 A1 | | 6/2014 |
| WO | 2015/137740 A1 | | 9/2015 |
| WO | 2017/069799 A1 | | 4/2017 |
| WO | 2017/069801 A1 | | 4/2017 |
| WO | 2017/069813 A1 | | 4/2017 |

OTHER PUBLICATIONS

SmartThings Product, retrieved from http://www.smartthings.com/prduct/ on Feb. 26, 2018, 9 pages.
SmartThings Hub, retireved from https://shop.smartthings.com/#!/products/smarthings-hub on Feb. 26, 2018, 16 pages.
SmartThings GE Light & Appliance Plug-and-ControlPower Outlet, retrieved from https://shop.smartthings.com#!products/ge-z-wave-wireless-lighting-control-lamp-module on Feb. 26, 2018, 14 pages.
Quirky, "Shop for products invented by real people" retrieved from http://www.quirky.com on Feb. 26, 2018, 1 page.
Quirky Spotter, retrieved from http://www.quirky.com/shop/609-spotter-multi-prupose-sensor on Feb. 26, 2018, 4 pages.
Quirky Pivot Power Genius, retrieved from http://www.quirky.com/shop/633-pivot-power-genius-power-control-from your-smartphone on Feb. 26, 2018, 6 pages.
Electric Imp. "How to run an imp offline: Making-and breaking-Internet connections" retrieved from http://eletricimpcom/docs/resources/offline/ on Feb. 26, 2018, 9 pages Electric Imp. "How to run an imp offline: Making-and breaking-Internet connections" retrieved from http://eletricimp.com/docs/resources/offline/ on Feb. 26, 2018, 9 pages.
Electric Imp, Inc. "specification: imp002 version Feb. 26, 2014" http://www.electricimp.com/ (2014) 18 pages.
Electric Imp, Inc. "specification: imp001 version Feb. 26, 2014" http://www.electricimp.com/ (2014) 14 pages.
Electric Imp, "The Interactive imp: how to manage communication between app, agent and device" retrieved from http://electricimp.com/docs/resources/interactive/ on Feb. 26, 2018, 11 pages.
Electric Imp, "Connectivity Made Simple" retrieved from http://electricimp.com/ on Feb. 26, 2018, 2 pages.
Electric Imp Product, retrieved from http://electricimp.com/product/ on Feb. 26, 2018, 3 pages.
Electric Imp Lockitron, retrieved from http://electricimo.com/productgallery/lockitron/ on Feb. 26, 2018, 2 pages.
Good, Max. 'Saber Edge Grill Review', in Amazing Ribs [online]. [retrieved on Jul. 6, 2018]. Retrieved from the Internet: <URLhttps://amazingribs.com/grill/saber-edge-grill-review>, 9 pages.
GMG Products LLC, "Dealer Price List, Aug. 1, 2015". 1 page.
GMG Product Brochure Publication (GMG Publication), https://web.archive.org/web/20101216012026/http:/www.greenmountaingrills.com:80/grills.html, retrieved Jan. 29, 2019, 3 pages.
GMG App User Guide. Datasheet [online]. Green Mountain Grills LLC, Jul. 28, 2014. [retrieved Sep. 11, 2018) Retreived from Internet: <https://greenmountaingrills.com/wp-content/uploads/2014/08/GMG-Singles-.pdf>, 20 pages.
Get Gookin'—Our Favorite Grills', in Modern in Denver [online]. Posted Jun. 1, 2015 [retrieved on Jul. 6, 2018]. Retrieved from the Internet: <URL:https://www.modernindenver.com/2015/06/grills/>, 8 pages.
Francis daCosta, Rethinking the Internet of Things: A Scalable Approach to Connecting Everything ch. 1 (2013) 185 pages.
File History for U.S. Pat. No. 10,158,720 Track One Grant (May 31, 2018), 4 pages.
File History for U.S. Pat. No. 10,218,833 Part 2, Exhibits 2001, in the matter of *GMG Products LLC v. Traeger Pellet Grills, LLC*, PGR Trial No. PGR2019-00024 regarding U.S. Patent No. 10,158,720, filed on Jun. 5, 2019, by the patent owner, 541 pages.
File History for U.S. Pat. No. 10,218,833 Part 1, Exhibits 2001, in the matter of *GMG Products LLC v. Traeger Pellet Grills, LLC*, PGR Trial No. PGR2019-00024 regarding U.S. Patent No. 10,158,720 filed on Jun. 5, 2019, by the patent owner, 363 pages.
File History for U.S. Pat. No. 10,158,720, Track One Request (Apr. 16, 2018), 2 pages.
Fielding et al., Standards Track: RFC 7230, Hypertext Transfer Protocol (HTTP/1.1): Message Syntax and Routing, Internet Engineering Task Force (IETF) (Jun. 2014) 89 pages.
Facebook post entitled "Green Mountain Grills—Corporate shared a photo." 4 pages, posted on Jul. 29, 2014 by user "Green Mountain Grills—Corporate". [retrieved Sep. 11, 2018} Retrieved from Internet: <https://www.facebook.com/GreenMountainGrills/posts/826618620691226>.
European Search Report and Search Opinion Received for EP Application No. 16857921.7, dated Apr. 30, 2019, 10 pages.
European Search Report and Search Opinion Received for EP Application No. 16857912.6, dated May 6, 2019, 6 pages.
European Search Report and Search Opinion Received for EP Application No. 16857913.4, dated Mar. 26, 2019, 11 pages.
Eugene Gorelik, Cloud Computing Models, MIT Working Paper, CISL #Jan. 2013 (Jan. 2013) 89 pages.
Emerson, Sensi Wi-Fi Programmable Thermostat Installation Guide (Sep. 2015) 13 pages.
Don Clark, The Race to Build Command Centers for Smart Homes, Wall Street J. (Jan. 4, 2015) 3 pages.
Declaration of Henry Houh, Ph.D., Exhibits 1102, filed on Mar. 15, 2019, by the petitioner, in the matter of *GMG Products LLC v. Traeger Pellet Grills, LLC*, PGR Trial No. PGR2019-00036 regarding U.S. Pat. No. 10,158,720, 194 pages.
Declaration of Henry Houh, Ph.D., Exhibits 1002, filed on Feb. 26, 2019, by the petitioner, in the matter of *GMG Products LLC v. Traeger Pellet Grills, LLC*, PGR Trial No. PGR2019-00034 regarding U.S. Pat. No. 10,218,833, dated Feb. 26, 2019, 159 pages.
Declaration of Henry Houh, PhD., Exhibits 1002, filed on Dec. 18, 2018, by the petitioner, in the matter of *GMG Products LLC v. Traeger Pellet Grills, LLC*, PGR Trial No. PGR2019-00024 regarding U.S. Pat. No. 10,158,720, 149 pages.
Davy Crockett Model. Datasheet [online]. Green Mountain Grills LLC, May 28, 2015. [retrieved Sep. 11, 2018] Retrieved from Internet: <https://www.manualslib.com/manual/863329/Green-Mountain-Grills-Davy-Crockett.html>, 2 pages.
Daugherty, Trevor. 'With summer approaching, SABER introduces the iPhone connected EDGE smart grill', in 9TO5Toys [online]. Posted Mar. 16, 2015 [retrieved Jul. 6, 2018]. Retrieved from the Internet: <URL:https://9to5toys.com/2015/03/16/sbaer-edge-iphone-connected-grill/>, 12 pages.
Dankirk. "Got My WiFi Upgrade". Pelletheads [online]. Posted on Aug. 22, 2014, 10:31:42 PM. [retrieved Sep. 11, 2018) Retrieved from Internet: <http://pelletheads.com/index.php?topic=30181.0>, 31 pages.
Custom Thermoelectric, "Power Generator (Seebeck) Module Installation," 2010, pp. 1-6.

(56) References Cited

OTHER PUBLICATIONS

Crock-Pot, Coming Soon! Crockpot(Registered) Smart Slow Cooker enabled with WeMo(Trademark) retrieved from http://www.crock-pot.com/slow-cookers/coming-soon%21-crock-pot%C2%AE-smart-slow-cooker-enabled-with-wemo%E2%84%A2/SCCPWM600-V1. html on Feb. 26, 2018, 8 pages.
Craig Goldwyn, "The Zen of Wood" May 1, 2008, <www.amazingribs. com>, accessed online at <web.archive.org/web/20080501010952/ http://www.amazingribs.com/tips_and_technique/zen_of_wood. html>.
Charles M. Kozierok, The TCP/IP Guide, The Advantages (Benefits) of Networking (vers. 3.0, Sep. 20, 2005) 3 pages.
Bennett6. "Server Mode is Here". Pelletheads [online]. Posted on Jul. 4, 2016, 11:58:19 AM. [retrieved Sep. 11, 2018] Retrieved from Internet: <http://pelletheads.com/index.php?topic=37421.0>, 16 pages.
Astrelgroup: "HOTTOH: Electronic solutions for the biomass heating". Mar. 15, 2016 (Mar. 15, 2016), pp. 1-36, Retrieved from the Internet: URL: http://www.astrelgroup.com/wp-content/uploads/2016/06/80H000011R1.1_Hottoh-Catalogue_EN_20160315.pdf [retrieved on Mar. 9, 2017].
Affidavit of Christopher Butler, Internet Archives Affidavit (Feb. 8, 2019) 6 pages.
U.S. Pat. No. 10,218,833 Patent File History, Sep. 27, 2018 Amendments, Exhibits 1038, in the matter of *GMG Products LLC* v. *Traeger Pellet Grills, LLC*, PGR Trial No. PGR2019-00034 regarding U.S. Pat. No. 10,218,833, filed on Feb. 26, 2019, by the petitioner, 12 pages.
U.S. Pat. No. 10,218,833 Patent File History, Oct. 16, 2018 Response to Amendments Under Rule 312, Exhibits 1039, in the matter of *GMG Products LLC* v. *Traeger Pellet Grills, LLC*, PGR Trial No. PGR2019-00034 regarding U.S. Pat. No. 10,218,833, filed on Feb. 26, 2019, by the petitioner, 02 pages.
U.S. Pat. No. 10,218,833 Patent File History, May 11, 2018, Non-Final Rejection, EXHIBITS 1036, in the matter of *GMG Products LLC* v. *Traeger Pellet Grills, LLC*, PGR Trial No. PGR2019-00034 regarding U.S. Pat. No. 10,218,833, filed on Feb. 26, 2019, by the petitioner, 18 pages.
U.S. Pat. No. 10,218,833 Patent File History, Mar. 13, 2017 Preliminary Amended Claims, EXHIBITS 1035, in the matter of *GMG Products LLC* v. *Traeger Pellet Grills, LLC*, PGR Trial No. PGR2019-00034 regarding U.S. Pat. No. 10,218,833, filed on Feb. 26, 2019, by the petitioner, 10 pages.
U.S. Pat. No. 10,218,833 Patent File History, Jul. 18, 2018 Amendments, EXHIBITS 1037, in the matter of *GMG Products LLC* v. *Traeger Pellet Grills, LLC*, PGR Trial No. PGR2019-00034 regarding U.S. Pat. No. 10,218,833, filed on Feb. 26 2019, by the petitioner, 11 pages.
U.S. Pat. No. 10,218,833 Patent File History, Jan. 14, 2019 Notice of Allowability, EXHIBITS 1041, filed on Feb. 26, 2019, by the petitioner, in the matter of *GMG Products LLC* v. *Traeger Pellet Grills, LLC*, PGR Trial No. PGR2019-00034 regarding U.S. Pat. No. 10,218,833, 2 pages.
U.S. Pat. No. 10,218,833 Patent File History, Dec. 6, 2018 Issue Notification, Exhibits 1044, filed on Feb. 26, 2019, by the petitioner, 01 page.
U.S. Pat. No. 10,218,833 Patent File History, Dec. 21, 2018 RCE and IDS, EXHIBITS 1040, filed on Feb. 26, 2019, by the petitioner, 11 pages.
"SmartChef Grill Guide English Spanish", 17.125395 Smart Chef Grill.indd, Sep. 27, 2016. pp. 1-16 (32 pages total).
"Interview with the developer of our WiFi controller." [online]. Posted Mar. 29, 2015. Retrieved Nov. 27, 2018. <https://web.archive.org/web/20150329163126/blog.greenmountaingrills.com/interview-david-developer-new-wifi-controller>, 3 pages.
"Char-Broil Operations Guide English French", 15.125115 VESCONN 2015 Grilling Guide ENG.indd, Jan. 19, 2016, pp. 1-20 (43 pages total).
Welcome to Life Lived on the Edge', in Edge: A Smarter Barbecue [online]. Posted Sep. 8, 2015 [retrieved on Jul. 8, 2018]. Retrieved from the Internet: <URL:https://www.sabergrills.com/Edge/features.html>, 4 pages.
Urban Griller. "GMG Server mode available". Smoke Fire and Food [online]. Posted on Jul. 6, 2016. [retrieved Sep. 11, 2018] Retrieved from Internet: <https://smokefireandfood.com/forum/index.php?thread/1632-gmg-server-mode-available/&s=91c16f3112ff4c847e243b766dee6abeb9553a5b>, 5 pages.
Ttdadmin, 'Smarter Cookouts With IoT-Enabled Grills', in DADO [online]. Posted May 7, 2015 [retrieved on Jul. 6, 2018] Retrieved from the Internet: <URL:http://dadolabs.com/smartercookoutswithiot/>, 5 pages.
Ttdadmin, 'Saber, Char-Broil and DADO Make Outdoor Cooking Smart at CES', in DADO [online]. Posted Jan. 7, 2015 [retrieved on Jul. 6, 2018]. Retrieved from the Internet: <URL:http://dadolabs.com/saberandcbatces/>, 5 pages.
Ttdadmin, 'Products', in DADO [online], [retrieved on Jul. 6, 2018] Retrieved from the Internet: <URL:http://dadolabs.com/category/products/>, 5 pages.
Ttdadmin, 'Product Showcase: Char-Broil(Registered) Simple Smoker with SmartChef(Trademark) Technology', in DADO [online]. Posted Mar. 25, 2016 [retrieved on Jul. 6, 2018]. Retrieved from the Internet: <URL:http://dadolabs.com/charbroil-simple-smoker/>, 12 Pages.
Ttdadmin, 'DADO & Partners Take Home Top Awards at Home Electronics Shows', in DADO [online]. Posted Mar. 16, 2015 [retrieved on Jul. 6, 2018]. Retrieved from the Internet: <URL:http://dadolabs.com/march2015awards/>, 4 pages.
The Statistics Portal, Cumulative Number of Apps Downloaded from the Apple App Store from Jul. 2008 to Jun. 2017 (in billions) (2019), 4 pages.
Tasarra-Twigg, Noemi. 'The Saber EDGE Smart Grill: Hi-tech BBQ', in Apple Gazette [online]. Posted Mar. 17, 2015 [retrieved on Jul. 6, 2018]. Retrieved from the Internet: <URL:http://www.applegazette.com/accessories-2/the-saber-edge-smart-grill-hi-tech-bbq/>, 7 pages.
Screen captures from YouTube video Clip entitled "Saber Edge Grill", 3 pages, uploaded on Apr. 5, 2015 by user "Max Good". Retrieved from Internet: <https://www.youtube.com/watch?v=mLZobNHMXbo>.
Screen Captures from YouTube video clip entitled "Network Setup on a Char-Broil Electric Smoker with Smartchef Technology", 5 pages, uploaded on Nov. 18, 2018 by user "Char-Broil Grills". Retrieved from Internet: <https://www.youtube.com/watch?v=bEt9_bLasas>.
Screen Captures and Transcript from YouTube video dip entitled "Green Mountain Grills—First Ever AC/DC Powered—Davy Crockett Promo Video", 5 pages, uploaded on Jul. 31, 2014 by user "Green Mountain Grills". [retrieved Sep. 11, 2018) Retrieved from Internet: <https://www.youtube.com/watch?v=R5huHfS5cHA&list=RDQMGcmWL20hfzw&index=17>.
Rus Shuler, White Paper, "How Does the Internet Work?" http://www.theshulers.com/whitepapers/internet_whitepaper/index.html#route (2005) 11 pages.
RFC 791, Internet Protocol, DARPA Internet Program Protocol Specification (Sep. 1981) 50 pages.
Procecution History for U.S. Pat. No. 10,158,720 (Part 2), EXHIBITS 2001, filed on Apr. 18, 2019, in the matter of *GMG Products LLC* v. *Traeger Pellet Grills, LLC*, PGR Trial No. PGR2019-00024 regarding U.S. Pat. No. 10,158,720, by the patent owner, 435 pages.
Procecution History for U.S. Pat. No. 10,158,720 (Part 1), EXHIBITS 2001, filed on Apr. 18, 2019, by the patent owner,in the matter of *GMG Products LLC* v. *Traeger Pellet Grills, LLC*, PGR Trial No. PGR2019-00024 regarding U.S. Pat. No. 10,158,720 ,350 pages.
Post Grant Review Petition of U.S. Pat. No. 10,218,833, Paper 3, filed on Feb. 26, 2019, by the petitioner, in the matter of *GMG Products LLC* v. *Traeger Pellet Grills, LLC*, PGR Trial No. PGR2019-00034 regarding U.S. Pat. No. 10,218,833, 109 pages.
Pew Research Center, U.S. Smartphone Use in 2015 at 36 (Apr. 1, 2015), 60 pages.
Petitioner's Reply to Patent Owners Preliminary Responce, PAPER 14, filed on May 17, 2019, by the petitioner, in the matter of *GMG*

(56) References Cited

OTHER PUBLICATIONS

*Products LLC* v. *Traeger Pellet Grills, LLC*, PGR Trial No. PGR2019-00024 regarding U.S. Pat. No. 10,158,720, 07 pages.
Petition by Green Mountain Grills for Post Grant Review of U.S. Pat. No. 10,158,720, filed on Mar. 15, 2019, PGR Trial No. PGR2019-00036, 110 pages.
Petition by Green Mountain Grills for Post Grant Review of U.S. Pat. No. 10,158,720, filed on Dec. 18, 2018, PGR Trial No. PGR2019-00024, 111 pages.
Patent Owner's Sur-Reply in Support of Patent Owner's Preliminary Responce, PAPER 15, filed on May 24, 2019, by the patentowner, in the matter of *GMG Products LLC* v. *Traeger Pellet Grills, LLC*, PGR Trial No. PGR2019-00024 regarding U.S. Pat. No. 10,158,720, 07 pages.
Patent Owner's Preliminary Responce, Paper 7, filed on Jun. 5, 2019, by the patentowner, in the matter of *GMG Products LLC* v. *Traeger Pellet Grills, LLC*, PGR Trial No. PGR2019-00034 regarding U.S. Pat. No. 10,218,833, Mailed on Mar. 5, 2019, 03 pages.
Patent Owner's Preliminary Responce, PAPER 10, filed on Apr. 18, 2019, by the patentowner, in the matter of *GMG Products LLC* v. *Traeger Pellet Grills, LLC*, PGR Trial No. PGR2019-00024 regarding U.S. Pat. No. 10,158,720, 47 pages.
Office Action dated Jul. 18, 2018, Norwegian IP Office, App No. NO 20170757, 2 pages.
Notice of Allowance for U.S. Appl. No. 15/954,199 dated Jul. 5, 2018, 23 pages.
Notice of Allowance for U.S. Appl. No. 15/510,996, dated Aug. 29, 2018, 17 pages.
Non-Final Office Action for U.S. Appl. No. 16/193,295 dated Dec. 26, 2018, 31 pages.
Non-Final Office Action for U.S. Appl. No. 15/510,996 dated May 11, 2018, 45 pages.
Non-Final Office Action for U.S. Appl. No. 15/114,744 dated Feb. 19, 2019, 67 pages.
Non-Final Office Action for U.S. Appl. No. 15/511,319 dated Dec. 20, 2018, 63 pages.
Murata Manufacturing Co., Ltd. "WiFi Module Data Sheet, Broadcom BCM43362 WiFi + ST Micro STM32F405 MCU, Tenative PIN: LBWA1ZV1CD-716" http://electricimp.com/docs/attachments/hardware/datasheets/imp003_LBWA1ZV1CD_060314.pdf Feb. 26, 2018, 24 pages.
Monitor All Aspects of Grill Performance From Your Smart Phone [online] Saber Grills, 2015 [retrieved on Jul. 6, 2018]. Retrieved from the Internet: <URL:https://sabergrilss.com/Edge/index.html>, 1 page.
Moataz Soliman el al., Smart Home: Integrating Internet of Things with Web Services and Cloud Computing, 2013 IEEE Int'l Conf. on Cloud Computing Tech. & Sci. 317-320 (2013).
Michael E. Porter & James E. Heppelmann, How Smart, Connected Products Are Transforming Competition, Harv. Bus. Rev. 65-88 (Nov. 2014), 28 pages.
MatthewC: "[Review] "Daniel Boone" Green Mountain Grill with WiFi—NZ TechBlog", May 9, 2015 (May 9, 2015), XP055577976 Retrieved from the Internet: URL:http://nztechblog.net/2015/05/09/review-daniel-boone-green-mountain-grill-with-wifi/ [retrieved on Apr. 5, 2019], 17 pages.
Lynx Smart Grill User Manual (archived May 21, 2015) 48 pages.
Jim Mahoney: "CyberCook—CyberQ WiFi Software : 2015 Blog", Blog Grillin' & Smoking BBQ, Feb. 1, 2015 (Feb. 1, 2015), pp. 1-26, XP055478026, us Retrieved from the Internet: URL:http://www.grillinsmokin.net/blogs all/blog 2015/files/cybercook-cyber-wifi-soft ware.php [retrieved on May 24, 2018].
International Written Opinion for International Application No. PCT/US2016/039271, dated Sep. 23, 2016, 10 pages.
International Written Opinion for International Application No. PCT/US2016/026736, dated Jul. 8, 2016, 9 pages.
International Written Opinion for International Application No. PCT/US2016/024737, dated Jul. 8, 2016, 8 pages.
International Search Report for International Application No. PCT/US2016/039271, dated Sep. 23, 2016, 3 pages.
International Search Report for International Application No. PCT/US2016/026736, dated Jul. 8, 2016, 3 pages.
International Search Report for International Application No. PCT/US2016/024737, dated Jul. 8, 2016, 3 pages.
International Preliminary Report on Patentability received for PCT Patent Application No. PCT/US2016/039271, dated May 3, 2018, 12 pages.
International Preliminary Report on Patentability received for PCT Patent Application No. PCT/US2016/026736, dated May 3, 2018, 11 pages.
International Preliminary Report on Patentability received for PCT Patent Application No. PCT/US2016/024737, dated May 3, 2018, 10 pages.
Hardwood Pellet Grills. Datasheet [online]. Green Mountain Grills LLC, Apr. 29, 2016. [retrieved Sep. 11, 2018] Retrieved from Internet: <https://greenmountaingrills.com/wp-content/uploads/2016/04/GMG_OperatingApp_Manual_Web.pdf>, 49 pages.
Green Mountain Pellet Grill—Jim Bowie Model—Daniel Boone Model. Datasheet [online]. Green Mountain Grills LLC, Oct. 7, 2010. Retreived from Internet: <https://www.bbqgrills.co.nz/wp-content/uploads/2015/06/preOctober2010Manual.pdf>.
Green Mountain Grills Announces Server Mode Is Now Available. Press Release [online]. Green Mountain Grills LLC, Dec. 5, 2017. [retrieved Sep. 11, 2018] Retrieved from Internet: <https://www.prnewswire.com/news-releases/green-mountain-grills-announces-server-mode-is-now-available-300567051.html>, 2 pages.
Anonymous:".: Learn How Green Mountain Grills Work :. Pellet Smokers and Grills", https://greenmountaingrills.com, Aug. 14, 2015 (Aug. 14, 2015), XP055670242, Retrieved from the Internet: URL:http://web.archive.org/web/20150814035439/https://greenmountaingrills.com/products/how-it-works/ [retrieved on Feb. 19, 2020].
Bowie et al., "A P P U S E R G U ID E Learn How to: Connect Your Grill to Your WiFi Create & Manage Food Profiles Control Your Grill via Smart Phone Controls", Feb. 21, 2015, XP055670253, Retrieved from the Internet:URL:https://web.archive.org/web/20150221235940if_/http://greenmountaingrills.com/wp-content/uploads/2014/08/GMG-Singles-.pdf retrieved on Feb. 19, 2020.
Chef Tips: "Green Mountain Pellet Grill—Smoker Review & FAQ", YouTube, May 19, 2013 (May 19, 2013), pp. 1-1, XP054980243, Retrieved from the Internet: URL:https://www.youtube.com/watch?v=fh_4TInOHMw [retrieved on Feb. 19, 2020].
JP Office Action dated Jan 27, 2020 for JP Application No. 2017536270.

* cited by examiner

CLOUD SYSTEM FOR CONTROLLING OUTDOOR GRILL WITH MOBILE APPLICATION

CROSS-REFERENCE TO RELATED APPLICATIONS

This application is a continuation-in-part of U.S. patent application Ser. No. 15/511,319, filed Mar. 15, 2017, which is a U.S. National Stage of PCT Application No. PCT/US2016/26736, filed on Apr. 8, 2016, which claims the benefit of priority to the U.S. Provisional Application No. 62/245,549, filed Oct. 23, 2015. This application is also a continuation-in-part of U.S. patent application Ser. No. 16/193,235, filed Nov. 16, 2018, which is a continuation of U.S. patent application Ser. No. 15/510,996, filed Mar. 13, 2017, which is a U.S. National Stage of PCT Application No. PCT/US16/24737, filed on Mar. 29, 2016, which claims the benefit of priority to U.S. Provisional Application No. 62/245,535, filed on Oct. 23, 2015. This application is also a continuation-in-part of U.S. patent application Ser. No. 15/114,744, filed Jul. 27, 2016, which is a U.S. National Stage of PCT Application No. PCT/US16/39271, filed on Jun. 24, 2016, which claims the benefit of priority to U.S. Provisional Application No. 62/245,530, filed on Oct. 23, 2015. The entire content of each of the aforementioned patent applications is incorporated herein by reference.

BACKGROUND

Outdoor appliances have long been used to prepare food and perform other tasks. For example, outdoor appliances such as grills and smokers are often used to prepare meats, vegetables, fruits, and other types of food. These grills and smokers are typically operated using manual controls that are integrated into the frame of the grill or smoker. For example, many such outdoor appliances have an ignition button that, when pressed, generates a spark near a gas outlet on a burner. The spark ignites the gas and the burner begins to create heat. The amount of heat is generally controlled using a dial or knob that allows more or less gas to be introduced at the burner.

In some cases, the outdoor appliances may have electronic controls. Thus, instead of having a manual dial to adjust the amount of gas being introduced at the burner, an electrical control is set or adjusted by the user. The electrical control then interacts with a solenoid or other electro-mechanical component to regulate the flow of gas to the burner. Still, however, as is the case with manual dials and nobs, the user of the outdoor appliance has to be present at the grill to make changes to settings on the grill.

To overcome this problem, some newly-manufactured outdoor appliances have been equipped with BLUETOOTH® radios. These BLUETOOTH® radios allow communication with nearby electronic devices including cell phones or tablets of the appliance's owner. Range limitations to the BLUETOOTH® radio, however, necessitate that the user of the appliance still be within a certain proximity of the appliance. Once outside this proximity, the user no longer has any communication with the appliance, and thus cannot control any functionality related to the appliance. Moreover, even when connected to a mobile device, the appliance has very limited options as to what can be controlled over BLUETOOTH®. Indeed, the appliance has no access to any information or control signals beyond the user's mobile device.

BRIEF SUMMARY

Embodiments described herein are directed to communicating with and controlling operation of electronically-controlled appliances. In one embodiment, a provided computer system includes the following: a receiver that receives inputs from computing systems including a first input indicating that an electronically-controlled appliance is permitted to communicate with the cloud computing platform. The computer system further includes a notification generator that generates notifications that are to be sent to software applications. The software applications are configured to control functions of the electronically-controlled appliance. The computer system further includes a transmitter that sends generated notifications to the software applications. A generated notification may indicate that the cloud computing platform is communicably connected to the electronically-controlled appliance. The receiver receives a second input from the software application indicating that various functions are to be performed on the electronically-controlled appliance. In response, the transmitter sends instructions to the electronically-controlled appliance to perform the specified functions. These functions are then interpreted and carried out by a hardware controller on the electronically-controlled appliance.

In another embodiment, a computer system performs a method for controlling an electronically-controlled appliance including receiving a first input from a computing system indicating that an electronically-controlled appliance is permitted to communicate with a cloud computing platform. The computer system generates a notification that is to be sent to a software application, where the software application is configured to control functions of the electronically-controlled appliance. The computer system transmits the generated notification to the software application, where the generated notification indicates that the cloud computing platform is communicably connected to the electronically-controlled appliance. The computer system then receives a second input from the software application indicating that specified functions are to be performed on the electronically-controlled appliance, and transmits instructions to the electronically-controlled appliance to perform the specified functions. These functions are then interpreted and carried out by a hardware controller on the electronically-controlled appliance.

In yet another embodiment, a cloud computing platform is provided for communicating with and controlling operation of electronically-controlled appliances. The cloud computing platform includes the following: a receiver that receives inputs from other computing systems including a first input indicating that an electronically-controlled appliance is permitted to communicate with the cloud computing platform. The receiver receives a second input indicating that specified functions are to be performed by the electronically-controlled appliance. Within the cloud computing platform, a control signal generator is provided which generates control signals that are to be sent to the electronically-controlled appliance. The control signals are configured to control functions of the electronically-controlled appliance according to the received second input. A transmitter is also provided within the cloud computing platform which transmits the generated control signals to the electronically-controlled appliance for performance of the specified functions. The functions are then interpreted and carried out by a hardware controller on the electronically-controlled appliance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1A:
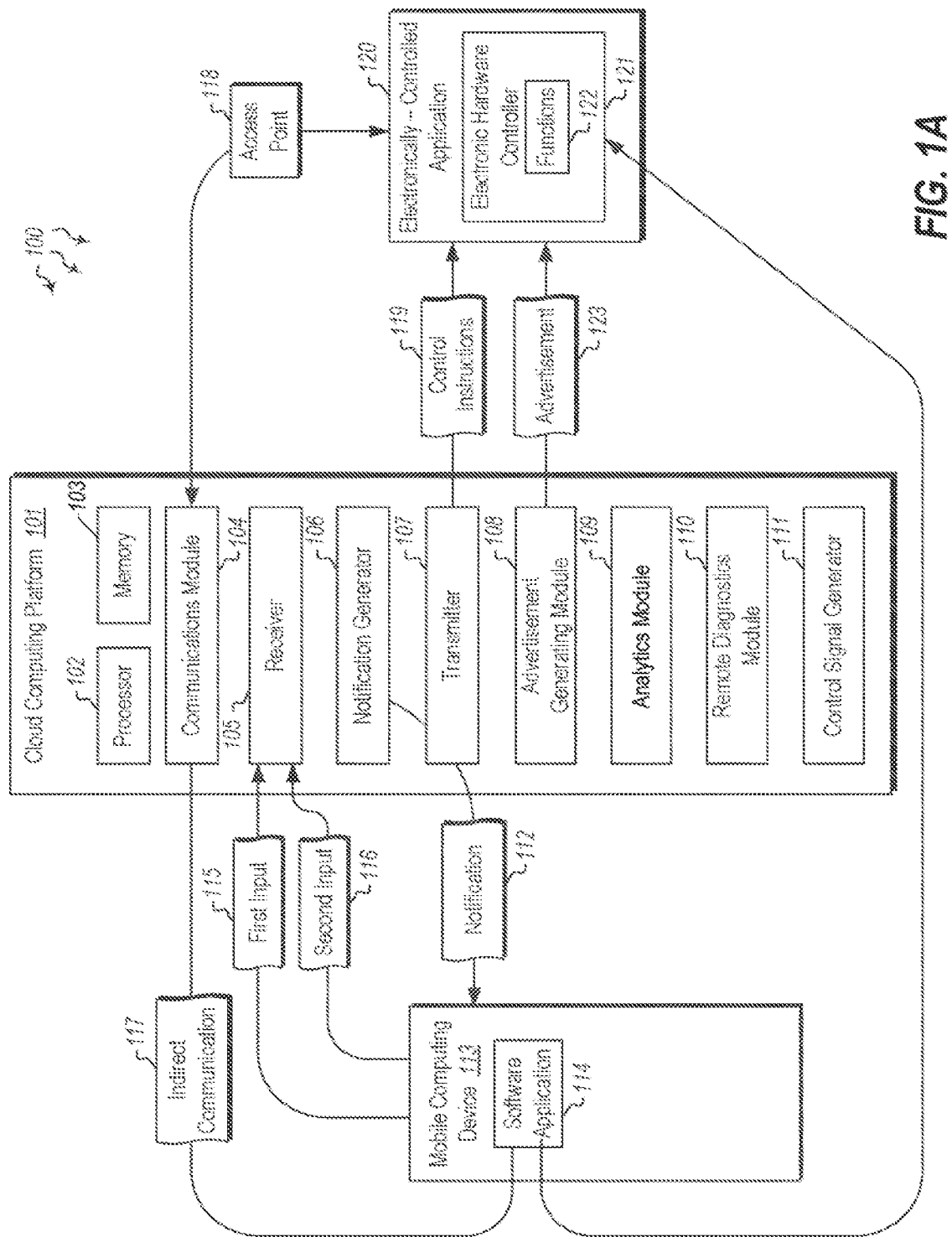
FIG. 1A illustrates a computer architecture in which embodiments described herein may operate including communicating with and controlling operation of electronically-controlled appliances.

Embodiments described herein are directed to communicating with and controlling operation of electronically-controlled appliances. In one embodiment, a provided computer system includes the following: a receiver that receives inputs from computing systems including a first input indicating that an electronically-controlled appliance is permitted to communicate with the cloud computing platform. The computer system further includes a notification generator that generates notifications that are to be sent to software applications. The software applications are configured to control functions of the electronically-controlled appliance. The computer system further includes a transmitter that sends generated notifications to the software applications. A generated notification may indicate that the cloud computing platform is communicably connected to the electronically-controlled appliance. The receiver receives a second input from the software application indicating that various functions are to be performed on the electronically-controlled appliance. In response, the transmitter sends instructions to the electronically-controlled appliance to perform the specified functions. These functions are then interpreted and carried out by a hardware controller on the electronically-controlled appliance.

In another embodiment, a computer system performs a method for controlling an electronically-controlled appliance including receiving a first input from a computing system indicating that an electronically-controlled appliance is permitted to communicate with a cloud computing platform. The computer system generates a notification that is to be sent to a software application, where the software application is configured to control functions of the electronically-controlled appliance. The computer system transmits the generated notification to the software application, where the generated notification indicates that the cloud computing platform is communicably connected to the electronically-controlled appliance. The computer system then receives a second input from the software application indicating that specified functions are to be performed on the electronically-controlled appliance, and transmits instructions to the electronically-controlled appliance to perform the specified functions. These functions are then interpreted and carried out by a hardware controller on the electronically-controlled appliance.

In yet another embodiment, a cloud computing platform is provided for communicating with and controlling operation of electronically-controlled appliances. The cloud computing platform includes the following: a receiver that receives inputs from other computing systems including a first input indicating that an electronically-controlled appliance is permitted to communicate with the cloud computing platform. The receiver receives a second input indicating that specified functions are to be performed by the electronically-controlled appliance. Within the cloud computing platform, a control signal generator is provided which generates control signals that are to be sent to the electronically-controlled appliance. The control signals are configured to control functions of the electronically-controlled appliance according to the received second input. A transmitter is also provided within the cloud computing platform which transmits the generated control signals to the electronically-controlled appliance for performance of the specified functions. The functions are then interpreted and carried out by a hardware controller on the electronically-controlled appliance.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g., character, double, floating-point), composite types (e.g., array, record, union, etc.), abstract data types (e.g., container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or removed without impacting the core system.

Referring to the figures, FIG. 1A illustrates an environment 100 in which at least one embodiment described herein may be employed. The environment 100 includes a cloud computing platform 101. The cloud computing platform 101 may include any number of local or distributed computer systems. The cloud computing platform 101 includes at least one hardware processor 102 and physical system memory 103. The cloud computing platform 101 further includes modules for performing a variety of different functions.

For instance, the communications module 104 may be configured to communicate with other computing systems (e.g., mobile computing device 113). The communications module 104 may include any wired or wireless communication means that can receive and/or transmit data to or from other computing systems such as wired or wireless network interface cards. The communications module 104 may be configured to interact with databases, mobile computing devices (such as mobile phones or tablets), electronically-controlled appliances (e.g., 120), embedded computing systems or other types of computing systems.

In one embodiment, the cloud computing platform 101 may be configured to communicate with mobile computing device 113 (e.g., a smart phone, laptop, tablet or wearable device) and/or with electronically-controlled appliance 120. The mobile computing device 113 may also be able to communicate with the electronically-controlled appliance 120, either directly or through the cloud computing platform 101. The electronically-controlled appliance 120 may be any type of appliance or device that is electronically-controlled. For example, any device that is controlled by an electronic hardware controller 121 would be an electronically-controlled appliance 120. The electronic hardware controller 121 may include computer memory that has instructions stored thereon for controlling the appliance or device.

In one example embodiment, the electronically-controlled appliance 120 is a grill or smoking appliance, although the embodiments described herein are not limited to such. The grill/smoker may be operated by the electronic hardware controller 121. The electronic hardware controller 121 may be configured to control temperature, control cooking cycles, control fuel burn rate, monitor ambient temperature, or perform other functions. In some cases, the electronic hardware controller 121 may include or be communicatively connected to a radio such as a BLUETOOTH® or WiFi radio that can wirelessly communicate with other computing systems (e.g., 101 and 113). The electronic hardware controller 121 may control these communications, and may present a display 125b to a user. The display 125b may include a variety of information, including a graphical user interface (GUI) that allows interaction from an appliance user.

The cloud computing platform 101 may be configured to interact with the electronically-controlled appliance 120 through the communications module 104. The cloud computing platform 101 further includes a receiver for receiving inputs from the mobile computing device 113. A software application 114 running on the mobile computing device 113 may include a GUI for controlling the electronically-controlled appliance 120. The GUI may provide various notifications, alerts, buttons, fields, prompts or other elements that allow monitoring and control of the electronically-controlled appliance 120.

In one embodiment, the cloud computing platform 101 is provided for communicating with and controlling operation of electronically-controlled appliances such as electronically-controlled appliance 120. The cloud computing platform 101 has hardware elements including a hardware processor 102, physical system memory 103, a receiver 105, a transmitter 107, various communication radios in the communications module 104, and other hardware elements. The receiver 105 may be configured to receive inputs from computing systems (including mobile computing device 113) such as first input 115 indicating that an electronically-controlled appliance is permitted to communicate with the cloud computing platform 101.

The cloud computing platform 101 also includes a notification generator 106 configured to generate notifications (e.g., 112) that are to be sent to software applications such as software application 114 running on mobile computing device 113. The software application 114 may be configured to control specified functions 122 of the electronically-controlled appliance 120. A transmitter 107 is also part of the cloud computing platform 101. The transmitter 107 may be configured to send a generated notification 112 to software application 114, where the notification indicates that the cloud computing platform 101 is communicably connected to the electronically-controlled appliance 120.

The receiver 105 may then receive a second input 116 from the software application 114 indicating that certain functions are to be performed on the electronically-controlled appliance 120. Upon receiving such an input, the transmitter sends control instructions 119 to the electronically-controlled appliance 120 to perform the specified functions. The functions are then interpreted and carried out by an electronic hardware controller on the electronically-controlled appliance 120 according to the control instructions 119.

These control instructions 119 may include, for example, an indication that a certain amount of fuel pellets are to be added to a smoker's combustion area, or that a specified amount of fuel (such as propane) is to be burned by a grill, or that a specified internal temperature is to be reached and maintained. The software application 114 may send a notification of availability to the cloud computing platform 101 to indicate whether the electronically-controlled appliance 120 is available or not to receive such control instructions 119.

If the notification of availability indicates that the electronically-controlled appliance 120 is currently available to receive instructions, the software application 114 may provide an access point 118 for a user to interact with. Through this user interface, the user can control the electronically-controlled appliance 120. The user interface may provide many different functions 122 that are controllable using the user interface. As mentioned above, these functions 122 may include substantially any function that the electronically-controlled appliance 120 is capable of (or is modified to be capable of) performing. For grill and smokers, this may include controlling burn rate, temperature, cooking cycle, fuel dispensing, controlling timers, accessing recipes, displaying probe temperatures or alerts, turning the device on or off, or other functions.

Other electronically-controlled appliances 120 such as ovens, refrigerators, blenders, toasters, dishwashers, coffee machines, mixers, bread makers, washers and dryers or other appliances may also be controlled using the software application 114 in a manner that is the same as or similar to that used to control a grill or smoker. The software application 114 may provide a notification of availability for the electronically-controlled appliance 120, and the application may display a user interface for controlling functions of that appliance. As inputs are received from a user, an instruction generator in the software application 114 may generate instructions that are specific to the appliance, and that are interpretable and understandable by the electronically-controlled appliance 120. These control instructions 119 are then sent to the electronically-controlled appliance 120 to control the functions 122 specified by the user.

In some cases, a user may control whether the electronically-controlled appliance 120 is permitted to communicate with the cloud computing platform 101 or with other computing systems such as mobile computing device 113. The electronically-controlled appliance 120 may send an indication to the cloud computing platform 101, indicating that it wishes to communicate with one or more mobile computing devices 113 (for example, to download a recipe). A user may provide input indicating whether the electronically-controlled appliance 120 is permitted to communicate with the mobile computing device 113 or not. If such communication is permitted by the user, the electronically-controlled appliance 120 may communicate with an access point 118 (such as a router) that permits flow of data between the electronically-controlled appliance 120 and the cloud computing platform 101 and/or between the electronically-controlled appliance 120 and the mobile computing device 113.

The cloud computing platform 101 further includes an advertisement generating module 108. The advertisement generating module 108 may generate advertisements 123 which are sent to the electronically-controlled appliance 120. The advertisements may be based on the user's use of the appliance, or may be based on a sale that might interest the user (such as a sale on brisket), or may be based on analytics. Indeed, the cloud computing platform 101 includes an analytics module 109 configured to perform analytics on usage data. The analytics module 109 may, for example, perform statistical analyses on usage data received from the electronically-controlled appliance 120. Then, based on the statistical analysis, the advertisement generating module 108 can generate an advertisement that would be most likely to be relevant to the user, based on their appliance usage.

Other modules such as the remote diagnostics module 110 and control signal generator 111 may also be included in the cloud computing platform 101. The remote diagnostics module 110 may analyze usage data and determine what problems are currently occurring on the appliance. The remote diagnostics module 110 may also analyze the appliance usage data and determine what problems are likely to occur based on the user's use of the appliance. A control signal generator 111 may be used by the cloud computing platform 101 to generate control instructions 119 that are sent to the electronically-controlled appliance 120 to perform specified functions 122. The control instructions 119 are interpretable by the appliance's electronic hardware controller 121. Once interpreted, the functions are carried out on the appliance according to the control instructions 119.

Figure 1B:
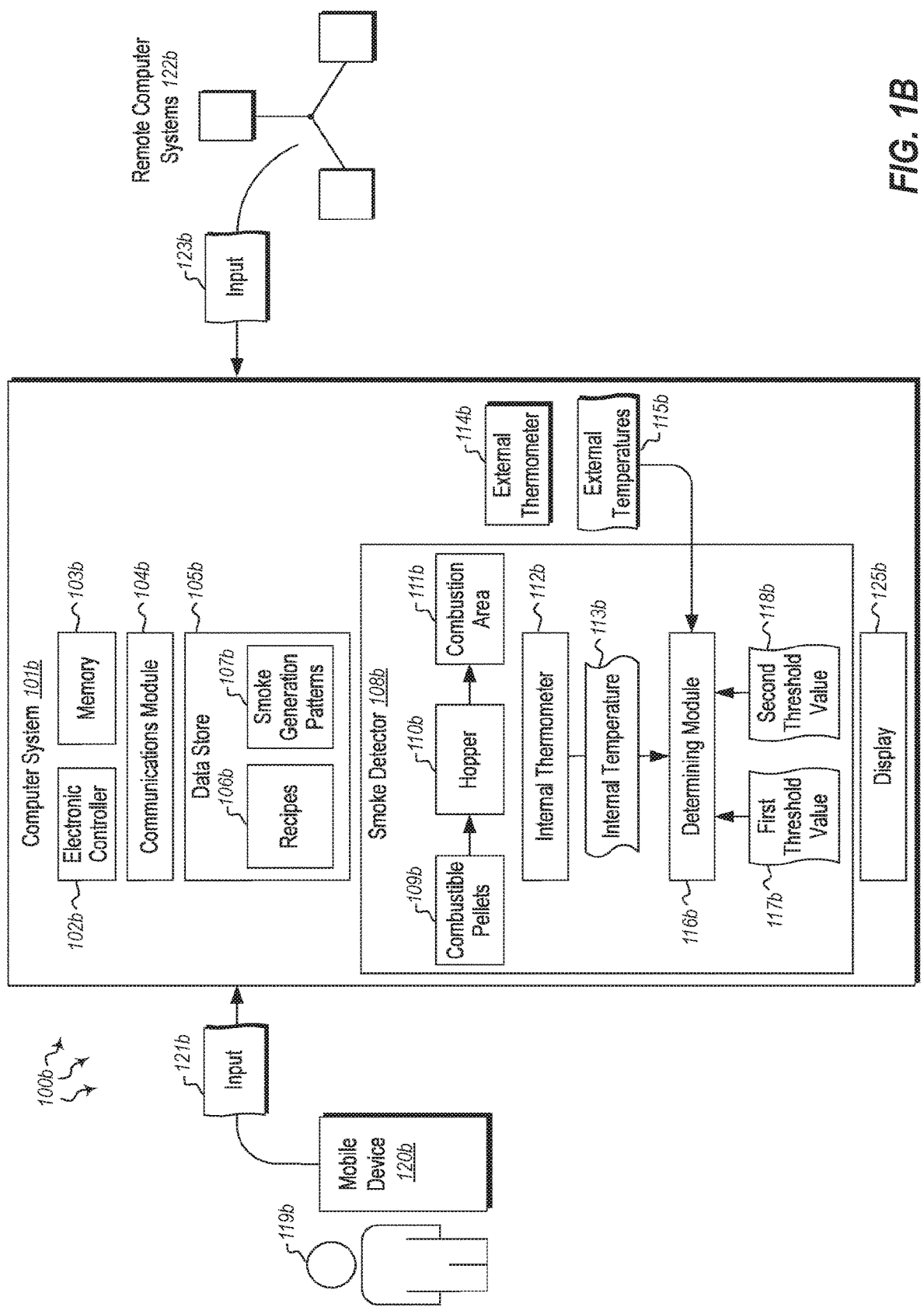
FIG. 1B illustrates a computer architecture in which embodiments described herein may operate including smoking food in an outdoor grill using a customized smoking routine.

FIG. 1B illustrates an environment 100b in which at least one embodiment described herein may be employed. The environment 100b includes an outdoor grill 101b. For example, the outdoor grill 101b may comprise an electronically-controlled appliance, as described above in regard to FIG. 1A. As used herein, the term "outdoor grill" means outdoor cooking apparatus, including barbecue grills, wood-pellet grills, and/or barbecue smokers. Barbecue smokers, in turn, refers to outdoor cooking apparatus that are configured to cook food at least in part through generated smoke, such as smoke generated through wood combustion. Accordingly, the outdoor grill 101b illustrated or otherwise described herein may be any type of cooking appliance including a conventional barbecue grill, smoker or other device.

In general, the outdoor grill 101b includes hardware and other modules for performing a variety of different functions. For instance, the outdoor grill 101b includes an electronic controller 102b. The electronic controller may be any type of microcontroller, microprocessor, or other processing means capable of processing software code. The software code may be stored on computer-readable media including memory 103b or other data storage 105b. The data storage may be flash or other non-volatile memory. As such, the outdoor grill 101b may have sufficient processing power and memory to be considered a computing system, or at least as having an attached computing system.

FIG. 1B further shows that the outdoor grill 101b can include a communications module 104b. The communications module 104b may be configured to communicate with other computing systems such as mobile device 120b used by user 119b, or remote computer systems 122b. As understood herein, a "mobile device" (120b) means any computing system (including but not limited to a smart phone) that enables a user to provide remote inputs, selections, and other controls that are communicated with outdoor grill 101b from a remote location. The communication between mobile device and outdoor grill 101b can occur over a network comprising a combination of wireless and hardwired connections. For example, mobile device 120b may be wirelessly connected to a network, or may be connected to the network over a network cable, such as a cable employing an Ethernet, USB, or other appropriate connection interface.

Thus, mobile device 120b can comprise a mobile phone, a tablet device, or may comprise another form of a remote control display, such as a digital remote control, including a network-enabled tablet-style touch screen having a graphical user interface displayed thereon. In one implementation, for example, mobile device 120b comprises an LCD screen having one or more controls (e.g., touch screen controls or physical push-button controls) that are used primarily within an indoor environment, and in any event remote from the outdoor grill 101b.

For example, the mobile device 120b may comprise a remote screen that is positioned or mounted on or about a kitchen countertop, but is nevertheless connected over a network (BLUETOOTH®, WiFi, or network cable) to outdoor grill 101b and/or remote computer systems 122b over a network. Specifically, the communications module 104b may include any wired or wireless communication means that can receive and/or transmit data to or from other computing systems. The communications module 104b may be configured to interact with databases, mobile computing devices (such as mobile phones or tablets), embedded or other types of computing systems. In some cases, the mobile device 120b and/or the remote computer systems 122b may be configured to provide inputs to the outdoor grill 101b. For instance, the mobile device 120b may provide input 121b to the outdoor grill 101b, such as by providing a "cooking profile" for a food item. This input may specify a recipe that is to be used, which in turn may specify a custom smoking pattern (or other temperature or flavor profile pattern involving operation of multiple components on outdoor grill 101b) that is to be used when preparing a certain portion of food. These recipes 106b and custom smoke generation patterns may be stored in data storage 105b and accessed by the electronic controller 102b.

The remote computer systems 122b may also provide inputs 123b to the outdoor grill 101b. These inputs may likewise be recipes or custom grilling or smoking pattern controls, including fan (on/off, speed or RPM) and/or hopper/auger adjustments, but may also be advertisements or other data pertinent to the grill owner. For example, as will be explained further below, the remote computer systems 122b may provide remote diagnostics or analytic information to the grill owner, displayable on an outdoor grill 101b display.

FIG. 1B further shows that the outdoor grill 101b includes a smoke generator 108b. In at least one embodiment, the smoke generator 108b includes hardware including a hopper 110b for loading combustible pellets 109b into the combustion area 111b. In some embodiments, the outdoor grill 101b may be a smoker that is fueled by combustible pellets 109b (such as wood pellets, or other appropriate combustion precursor). The hopper 110b may supply the fuel to the combustion area 111b at a specified rate so as to maintain a specific internal temperature 113b. The internal temperature may be measured by an internal thermometer 112b that is inside outdoor grill 101b. The determining module 116b of the smoke generator 108b may, for example, determine that the current internal temperature 113b is too low, and may cause the hopper 110b to load more combustible pellets/fuel 109b into the combustion area 111b, and/or to adjust a fan or other components to help increase temperature. Conversely, if the internal temperature is too high, the loading of pellets/fuel into the combustion area 111b may be halted for a time until the temperature has cooled, and similarly to adjust a fan up/down or on/off to assist in cooling.

At least in some embodiments, the outdoor grill 101b may be controlled by user 119b via the mobile device 120b. The mobile device 120b may be configured to run an application that allows the user 119b to control functionality of the outdoor grill 101b. Using the software application, for example, the user 119b may cause the outdoor grill 101b to ignite and begin a specified "cooking profile" assigned to the food item, such as a recipe employing a particular smoking pattern geared toward a particular end result in the food item. For instance, the user 119b may direct use of a particular cooking profile for a food item by selecting one of the stored recipes 106b or smoke generation patterns 107b stored on the grill's data storage 105b, wherein the selected recipes 106b comprise one or more flavor, smoke, temperature or other cooking profile features for a particular food item.

Thus, the "cooking profile" in at least one embodiment comprises a set of values contained in one or more files associated with a food item, such as files contained in a downloadable recipe (from remote computer systems 122b), which are intended to produce a particular end result in the food item. For example, a cooking profile for a particular type of beef may include specifications that the final product be "medium rare," or reddish pink in terms of internal color, and/or may specify an internal temperature for the food item, such as 135° F. (57° C.). The cooking profile may alternatively indicate that the meat needs to be tender enough to shred, or contain a certain amount of smoke flavor in the meat.

Each of these end results may be driven in part by a downloaded recipe, or by manual inputs by a user at outdoor grill 101b or via mobile device 120b. The recipe may include such values as cooking time, amount of smoke applied and when, internal grill temperature, and so on. The cooking profile, in at least one implementation, may be used to adjust certain recipe steps in accordance with other variables that occur during a cooking cycle to ensure the overall end result. In general, therefore, a cooking profile can be understood as overall characteristics of a food item based on an intended end result for the particular food item, whereas a "recipe" refers to the generally modifiable steps used to achieve the end result.

Accordingly, embodiments of the present invention provide a grill system that enables the user to automatically control various aspects of a cooking process for different performance levels. In particular, embodiments of the present invention enable a user to automatically or manually monitor and adjust a grill temperature, to change or start a timer, to adjust a smoking pattern, to set the grill to a "keep warm," or to adjust other state, or to perform other controls specifically geared toward a particular flavor or other desired end result.

Embodiments of the present invention allow the user to be as involved or uninvolved as desired, and to handle grilling procedures from a remote location. In particular, embodiments of the present invention enable a user to have part or full control over cooking a food item, and thus operation of multiple components of the outdoor grill in general accordance with multiple user preferences to whatever extent the user desires to be involved in controlling the operation or outcome, and regardless whether the user is away on travel, or at home in a living room.

Figure 2:
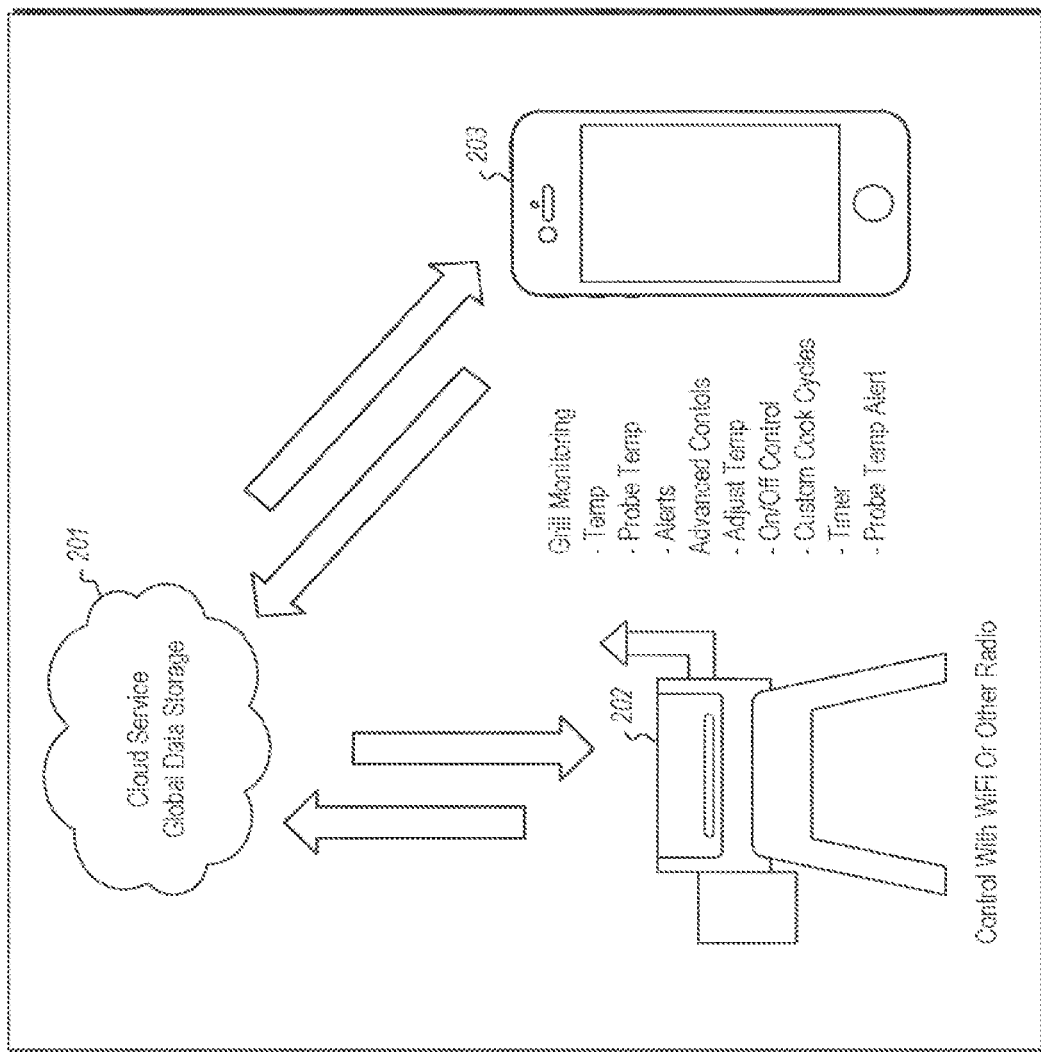
FIG. 2 illustrates an embodiment in which an electronically-controlled appliance is in communication with a cloud service and a mobile electronic device.

FIG. 2 illustrates an embodiment in which a smoker/grill 202 is controlled via a smart phone 203 (or rather via a software application running on the smart phone). The smart phone 203 may communicate with a cloud service 201 which, in turn, communicates with the smoker/grill 202. The cloud service 201 may provide data storage along with other features. The data storage may store, for example, recipes used by the smoker/grill 202 to smoke meats, vegetables, fruits or other food items. Using the cloud service 201, a customer or user may use their smart phone 203, tablet, laptop, desktop or other computer system to control the functions of the smoker/grill 202.

The functionality may include smoker/grill monitoring including monitoring of the internal temperature, external ambient air temperature, probe temperature (e.g., from probes that communicate wirelessly), and alerts that may be raised by the grill or smoker. Other controls may include adjusting the temperature by adding more fuel, or allowing the existing fuel (such as pellets) to burn down so as to reduce the temperature, turning the device on or off or turning certain components on or off, controlling the timer or custom cooking cycles, or monitoring probe temperature alerts. Many more controls may be provided on the smart phone 203, and the amount and type of controls may be updated over time to add new functionality.

As control inputs are received at the smart phone 203 (or other electronic device), they are passed to the cloud service 201 via a wired or wireless data transmission. The control inputs are then passed to the smoker/grill 202 directly or via an access point such as a WiFi router. In this manner, a user may be able to control their smoker/grill from substantially any location that has internet access. In some cases, the user may even be able to ignite the smoker/grill 202 remotely, while in other cases, such functionality may be disabled unless the user is within a specified distance of the grill, as determined by a GPS or BLUETOOTH® geofence.

Figure 3:
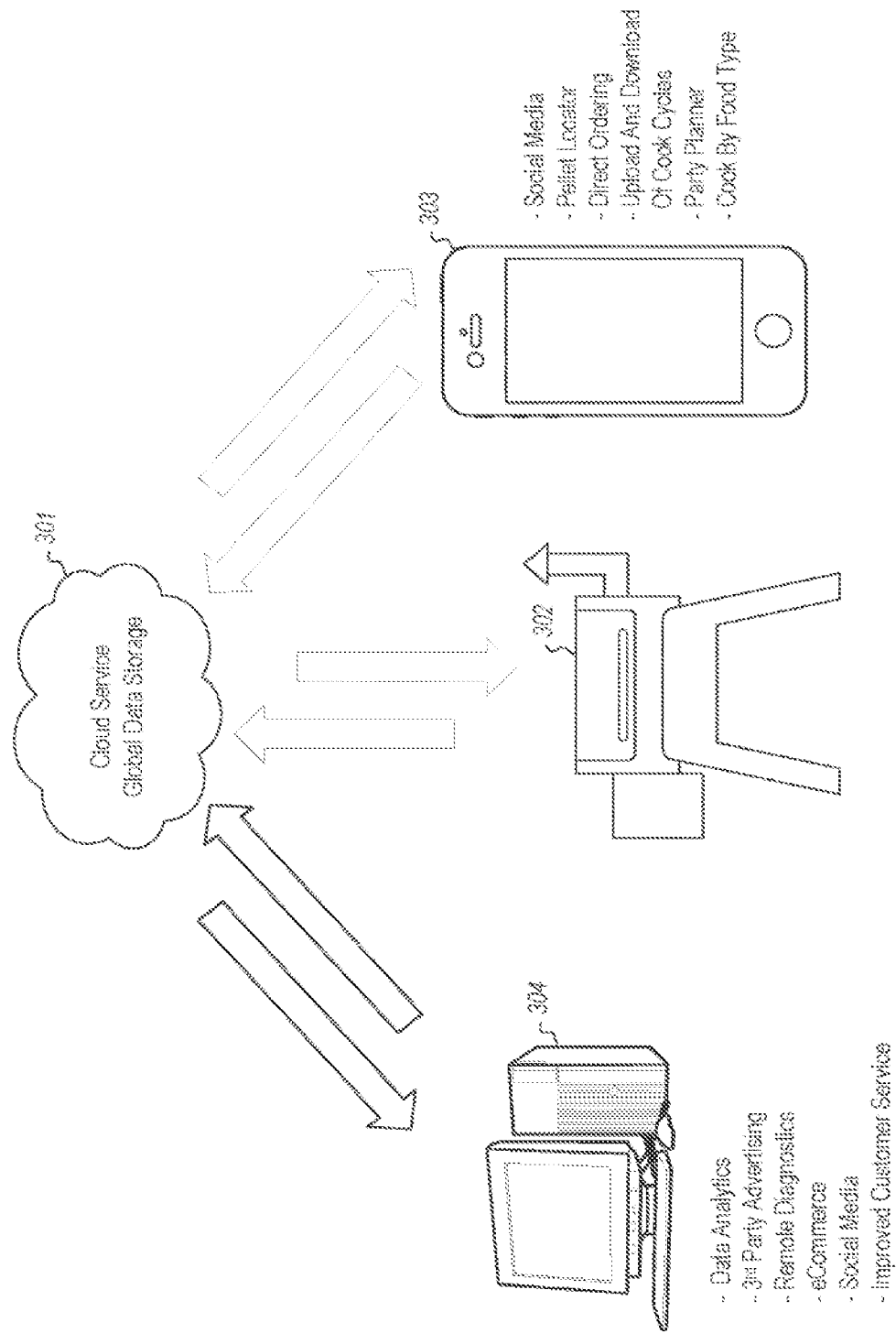
FIG. 3 illustrates an embodiment in which an electronically-controlled appliance is in communication with a cloud service and a mobile electronic device, and is further in communication with analytics, social media or other third-party systems.

FIG. 3 illustrates an environment similar to that of FIG. 2 in which a cloud service 301 links various devices including a smoker/grill 302 and a smart phone 303 or other electronic computing device 304. The cloud service 301 is also connected to various other services and systems including, but not limited to, data analytics, third-party advertising, remote diagnostic services, eCommerce services, social media, customer service assistance and others. For example, usage data for the smoker/grill 302 may be uploaded to the cloud service 301 and stored in the global data storage.

This usage data (such as when the smoker was turned on, how long was it turned on, what temperature did it reach, what was the average internal temperature, what was the average external temperature, what cooking/smoking recipe was used, what controls were used and when or other operational usage data) may be analyzed by an analytics engine in combination with data from other users. As such, usage data from many different users may be logged and analyzed to identify broad patterns of use. These analytics may then be used to refine and improve future smokers or grills, or may be used for other purposes such as providing advertising.

In one example, the cloud service may track users' usage of the smoker/grill, and may determine which products or recipes may be of interest to a given user based on similarities between their usage of the grill and other's usage. The usage data may also be used to perform remote diagnostics of the smoker/grill 302. For instance, the usage data may indicate that a user's grill temperature exceeded a normal operating temperature (e.g., due to a grease fire). As such, certain parts may have failed or may be likely to fail due to the extreme heat. Other usage data may indicate different problems that may be likely to occur as a result of how the user is using their grill. Usage data may also be sent to social media announcing successful implementation of a recipe, or announcing to party guests that a specified meat is smoking and will be ready at a certain time. Many other social media implementations may also be used as provided by the cloud service 301.

Figure 4:
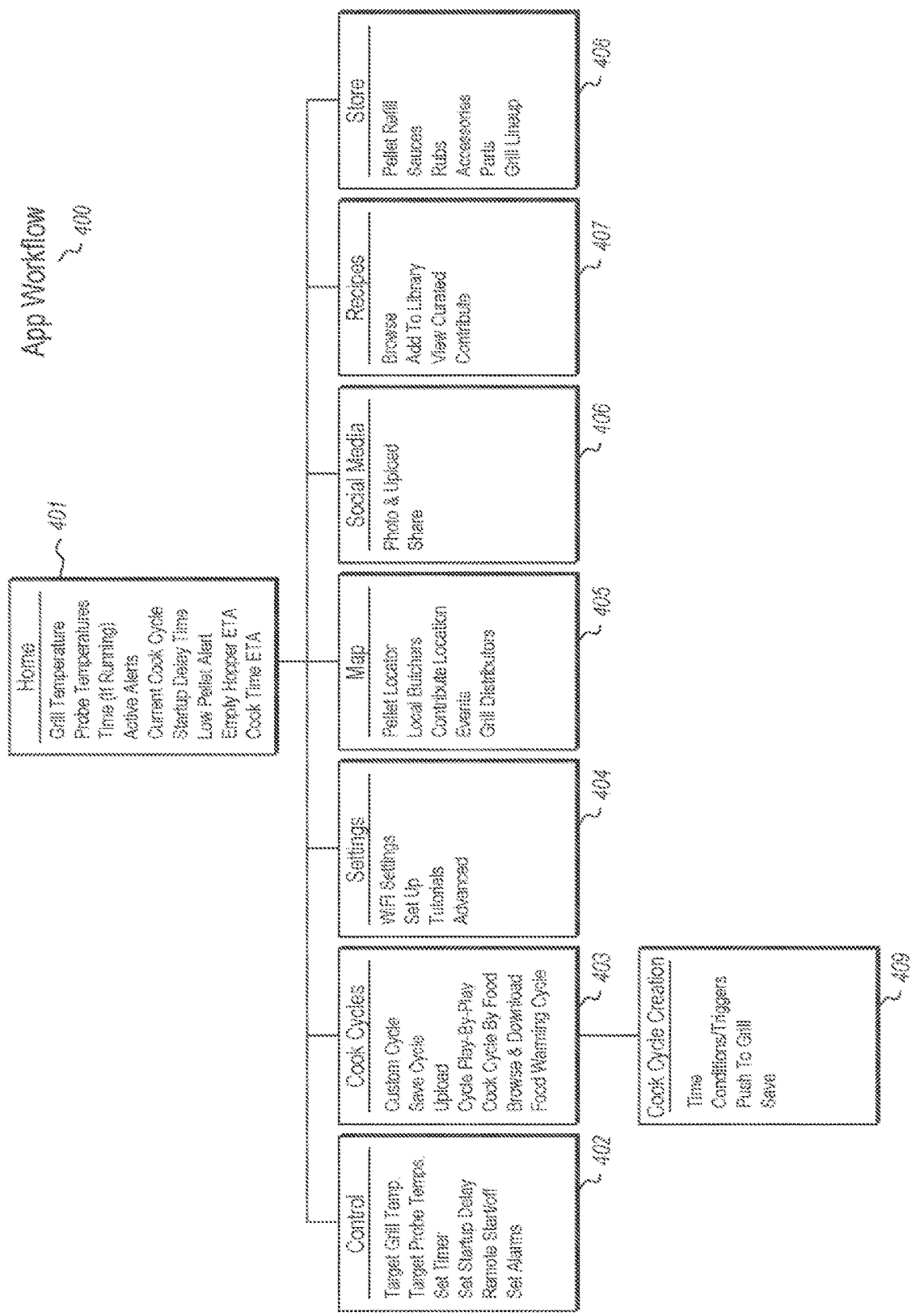
FIG. 4 illustrates an embodiment of a software application functionality hierarchy.

FIG. 4 illustrates an application workflow 400 for a software application such as software application 114 of FIG. 1A. The application may run on a mobile device such as a phone or tablet or wearable device, or may be run on a desktop computing system or may be run through a web browser. It will be understood that the application workflow 400 is one example of an application workflow, and other embodiments and implementations are possible.

The application workflow 400 includes a home menu 401 that, on launch, shows the status of the grill (or other electronically-controlled appliance), the status of any probes in use, the status of any timers in use and any alerts. A first time setup may walk a user through connecting the grill to an access point (such as a WiFi access point), and linking the mobile device to the grill. The first time setup may also take the user through a tutorial on how to use the grill, or at least certain components of the grill. The home menu 401 may show any or all of the following: grill temperature, probe temperature, timer (if running), active alerts (e.g., a low pellet alert or an empty hopper alert), current cook cycle, current cook time-to-completion, startup delay time, or other information.

The application may have many different tabs and menus, including one or more of the following: a control menu 402 that allows users to control the grill's target temperature, control the grill's target probe temperatures, set or restart timers, set startup delays, remotely start or turn grill off, set alerts or perform other functionality. A cook cycles menu 403 may be provided which allows users to select from different cooking cycles (i.e., pre-programmed cooking routines that control temperature for a specified amount of time to cook or smoke the food item in a certain manner), save cooking cycles, upload cooking cycles to a cloud service (e.g., 301 of FIG. 3), provide the user a play-by-play indicator of what is occurring during a cooking cycle, implement a certain cook cycle for a given food, browse and download recipes and/or cook cycles, provide access to a food warming cycle that keeps the food at a certain temperature for a specified time, or perform other functions.

The cook cycles menu 403 may have one or more submenus including a cook cycle creation menu 409. The cook cycle creation menu 409 may allow a user to create his or her own custom cooking cycle. The custom cooking cycle can specify a given time to begin and end, a certain temperature to hold or change to throughout the cycle, various customizable triggers or conditions that may cause changes to the cooking cycle such as shortening or lengthening the cooking time, or increasing or decreasing internal grill temperature for a given length of time. The cook cycle creation menu 409 may allow a user to push the customized cooking cycle to the grill and have the grill begin implementation of the cycle. This customized cooking cycle may also be saved directly on the grill or in the cloud service 301.

Other menus provided on the application workflow may include a settings menu 404. The settings menu may allow a user to set up WiFi, BLUETOOTH® or communication means on the grill. The settings menu 404 may also allow configuration settings to be accessed and changed. The settings menu 404 may further provide tutorial as well as other appliance- or application-specific settings that may be changed using the settings menu. A map menu or tab 405 may be provided which gives access to local retailers including pellet sellers or distributors, local butchers or farms for meat or vegetables, local events including barbeques or tailgate parties, or locations of nearby grill distributors. The map menu 405 may also provide other information that is specific to the appliance, such as a repair shop that specializes in repairs for that appliance.

A social media menu 406 may be provided which allows users to upload photos, recipes, videos or other media which may be of interest to other users. The social media tab may allow the user to post images or status updates to social media websites, including location pins, updates from the grill itself or other information. As such, the social media menu 406 allows users to share their grilling/smoking experience with others.

A recipes menu 407 allows users to browse recipes available online or through the cloud service 301. When browsing these recipes, the user may select to download the recipes to their phone or other device. These recipes can be collected in a library and shared via social media. Users can sort the recipes, add their own recipes, add pictures to others' recipes or otherwise interact with the recipe database. A store menu 408 allows a user to purchase pellets, propane or other fuel, purchase sauces, rubs, grill accessories, grill parts or full grills/smokers. The store may be expanded to allow the purchase of food items or other items that may be used in conjunction with the grill. The concepts described above will be explained further below with regard to method 500 of FIG. 5.

Figure 5:
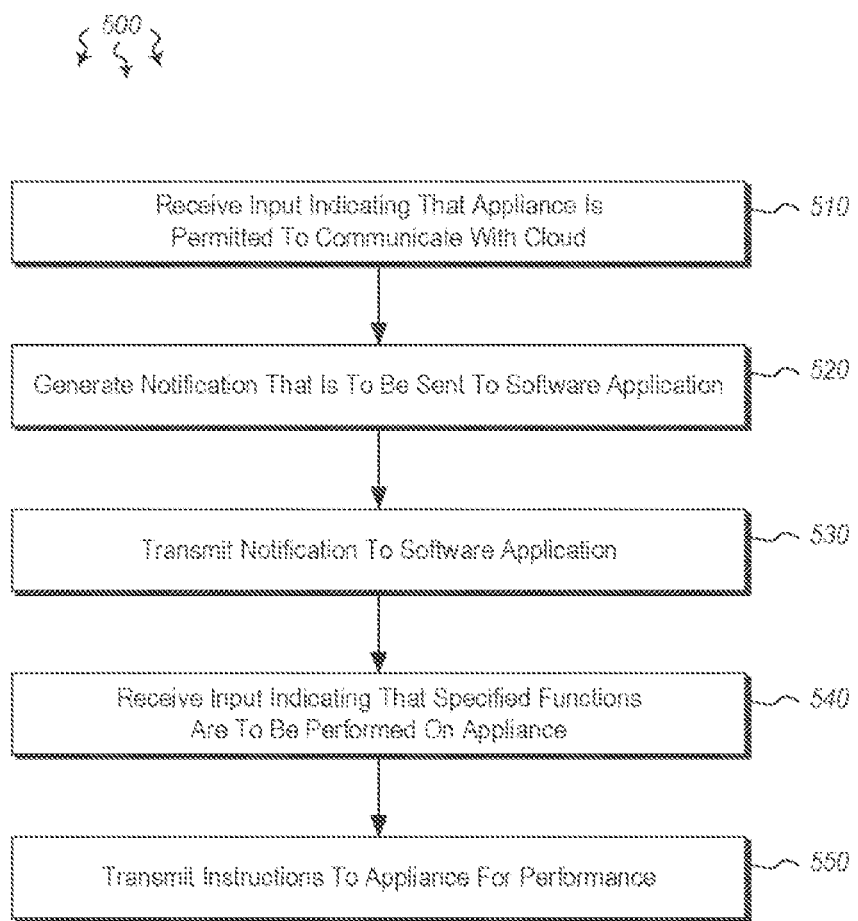
FIG. 5 illustrates a flowchart of an example method for communicating with and controlling operation of electronically-controlled appliances.

In view of the systems and architectures described above, methodologies that may be implemented in accordance with the disclosed subject matter will be better appreciated with reference to the flow chart of FIG. 5. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a flowchart of a method 500 for communicating with and controlling operation of electronically-controlled appliances. The method 500 will now be described with frequent reference to the components and data of environment 100.

Method 500 includes receiving a first input from one or more computing systems indicating that at least a first electronically-controlled appliance is permitted to communicate with a cloud computing platform (510). For example, cloud computing platform 101 may receive first input 115 from mobile computing device 113 indicating that electronically-controlled appliance 120 is permitted to communicate with the cloud computing platform. The cloud computing platform 101 may thus be apprised that the electronically-controlled appliance 120 will be sending data requests to the platform or will otherwise be attempting to communicate with the platform. In some cases, the communication may include requesting to download a recipe or custom cooking cycle.

Method 500 further includes generating a notification that is to be sent to a software application, the software application being configured to control one or more functions of the electronically-controlled appliance (520). The notification generator 106 of the cloud computing platform 101 may generate notification 112 which is sent to be sent to the software application 114 of the mobile computing device 113. The notification 112 indicates that the cloud computing platform is communicably connected to the electronically-controlled appliance 120. After this notification 112 is generated, the transmitter 107 of the cloud computing platform 101 transmits the generated notification to the software application 114 (530).

Method 500 also includes receiving a second input from the software application indicating that one or more specified functions are to be performed on the electronically-controlled appliance (540). For instance, the receiver 105 of the cloud computing platform 101 may receive second input 116 from the mobile computing device 113. The second input specifies functions 122 that are to be performed on the electronically-controlled appliance 120. The functions may include adjusting the temperature by increasing or decreasing burn rate, monitoring internal or external temperatures, monitoring wireless probes, adjusting or setting timers, or performing other functions applicable to the appliance. The transmitter 107 then transmits control instructions 119 to the electronically-controlled appliance 120 to perform the specified functions 122 (550). The functions 122 are interpreted and carried out by an electronic hardware controller on the electronically-controlled appliance 120.

The receiver 105 of the cloud computing platform 101 may further receive portions of data including ambient temperature data for the environment in which the electronically-controlled appliance 120 resides. For example, a grill or smoker may record the ambient air temperature using a temperature sensor on the outside of the appliance. The ambient air temperature may be monitored throughout the cooking cycle, and may lead to a change in operation. For example, the control instructions 119 may be altered by the cloud computing platform 101, prior to transmission to the electronically-controlled appliance 120, to compensate for the ambient air temperature. For instance, on a hotter day, the cooking cycles may be adjusted to avoid overheating the meat or other food, while on a colder day, the cooking cycles may be adjusted upwards to burn hotter so as to maintain the desired temperature. Other adjustments may also be made based on the ambient air temperature.

The electronic hardware controller 121 of the electronically-controlled appliance 120 may be configured to receive food temperature data from a digital thermometer. The digital thermometer may be communicably connected to the electronic hardware controller 121 of the grill and/or to the cloud computing platform 101. The digital probes may be configured to interact with the cloud computing platform regardless of which grill or other appliance it is used with. In some cases, prior to transmitting the control instructions 119, the cloud computing platform adjusts the control instructions to further include an alert based on the food temperature data.

For instance, the electronic hardware controller 121 may communicate with the digital thermometer, and set alerts based on probe temperature. When the alerts are triggered, the electronic hardware controller 121 communicates with the cloud computing platform 101 and/or the mobile computing device 113. Moreover, a user can use the software application 114 on the mobile computing device 113 to monitor probe temperatures, internal temperatures, and/or ambient temperatures using the software application 114 on the mobile computing device 113.

At least in some embodiments, the cloud computing platform 101 may be configured to communicate directly with the electronically-controlled appliance via an access point 118 within range of the electronically-controlled appliance 120. A user of the mobile computing device 113 may use the software application 114 to grant permission for the electronically-controlled appliance 120 to communicate directly with the cloud computing platform 101. As such, the electronically-controlled appliance 120 may send and receive data from the cloud computing platform 101 through a wired or wireless access point 118. In other cases, the cloud computing platform 101 may communicate with the electronically-controlled appliance 120 through the software application 114 provided on the mobile computing device 113. The software application 114 relays communications (i.e., indirect communication 117) between the cloud computing platform 101 and the electronically-controlled appliance 120.

In addition to facilitating communication between the mobile computing device 113 and the electronically-controlled appliance 120, the cloud computing platform 101 may also provide services such as advertising services. The cloud computing platform 101 includes an advertisement generating module 108 configured to generate advertisements 123 for transmission to the electronically-controlled appliance 120 or to the software application 114 running on the mobile computing device 113. The advertisement generating module may, for example, access information from local retailers including grocery stores. Based on grill or smoker usage data, the cloud computing platform 101 may determine which ads would be most interesting to a user, and may send those advertisements 123 to the software application 114 or to the grill directly. The advertisements 123 may be tailored for users of the electronically-controlled appliance 120 based on usage information for the user and potentially based on nearby user's appliance usage.

Indeed, the cloud computing platform 101 may receive usage data from many different electronically-controlled devices including electronically-controlled appliance 120. This usage data may be used for a variety of purposes, including generating targeted advertising. The usage data may also be used by the analytics module 109. The analytics module 109 may be configured to analyze the usage data associated with the electronically-controlled appliances and generate appliance-related analytics for the electronically-controlled appliance(s). The usage data may include wattage drawn by a hot rod, time turned on, temperature (internal and external), indications of how the user cooks, when they cook, what recipes they use, etc. The analytics data may generally show, for a specific user or for a grouping of users, how the users are using their grills or other appliances.

In one example, the analytics data is used to verify or void a warranty claim. For instance, if a user had a grease fire in the grill causing the internal temperature to exceeded 800 degrees Fahrenheit, the cloud computing platform 101 would know what had occurred, and would know that the warranty was voided due to the excessive temperature. Contrariwise, if a user makes a warranty claim and their usage has been within normal parameters, the warranty claim may be verified and fulfilled.

The cloud computing platform 101 may further include a remote diagnostics module 110 that is configured to perform remote diagnostics on the electronically-controlled appliance 120. The remote diagnostics module 110 may access the user's usage data to predict failures for certain components of the electronically-controlled appliance 120. If the appliance has been mistreated or heavily used in a certain manner, the remote diagnostics module 110 may be able to determine that a component failure is likely and may prompt the user (via a display on the grill such as that shown in FIG. 6 or via the software application 114) to replace the component or at least indicate that a failure may be imminent. The remote diagnostics module 110 may also be able to determine why a given part isn't working based on the appliance's usage information.

Figure 6:
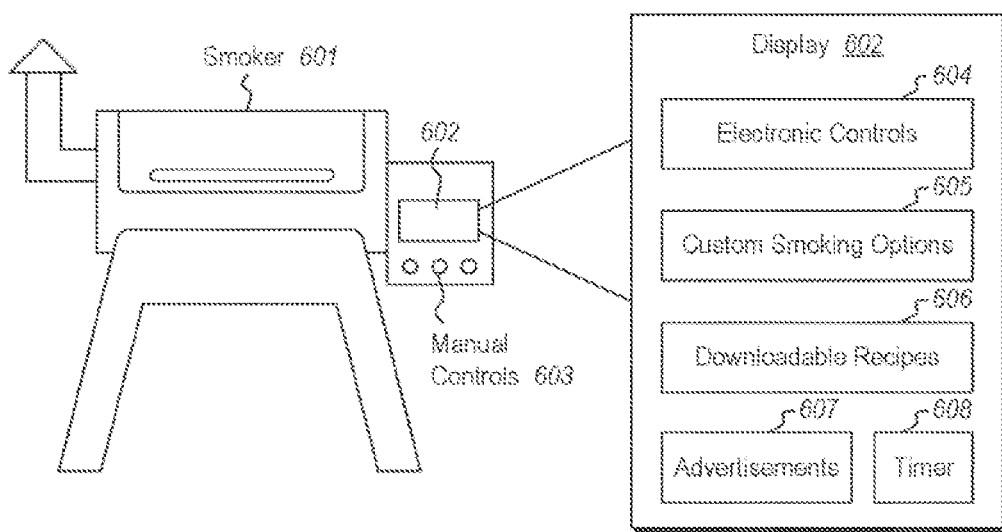
FIG. 6 illustrates an embodiment of a display that is part of an electronically-controlled smoker appliance.

FIG. 6 illustrates an embodiment of a smoker 601 which is an electronically-controlled device. The smoker 601 has one or more manual controls 603 such as buttons or knobs, as well as a display 602. The display may be a touchscreen display that allows a user to provide input. The display 602 may include electronic controls such as buttons or sliders or input fields that allow users to adjust settings on the smoker

601. One input field may be a "Custom Smoking Options" field 605 that allows users to input their own customized smoking cycles or modify existing smoking cycles. These smoking cycles may apply to certain meats or to certain recipes and may be used to achieve a certain result. The display 602 may include other controls including a "Download Recipes" button 606 that allows users to download recipes directly to the smoker 601 through the access point 118 or through the software application 114. The display 602 may also include a place to display advertisements 607, a timer 608, or other items which may be useful to an appliance user.

Additionally or alternatively, an embodiment of a cloud computing platform is provided (e.g., 101 of FIG. 1A) for communicating with and controlling operation of electronically-controlled appliances (e.g., 120). The cloud computing platform 101 has a hardware processor 102, a receiver 105 configured to receive inputs from other computing systems including a first input 115 indicating that the electronically-controlled appliance 120 is permitted to communicate with the cloud computing platform. The receiver 105 also receives a second input 116 indicating that various specified functions 122 are to be performed by the electronically-controlled appliance 120.

The cloud computing platform 101 also includes a control signal generator 111 configured to generate control instructions 119 that are to be sent to the electronically-controlled appliance 120. The control instructions 119 are configured to control functions 122 of the electronically-controlled appliance 120 according to the second input 116. The cloud computing platform 101 also includes a transmitter 107 that transmits the generated control instructions 119 to the electronically-controlled appliance 120 for performance of the specified functions 122. These functions are then interpreted and carried out by an electronic hardware controller 121 on the electronically-controlled appliance 120.

In some cases, the cloud computing platform 101 may further include or be communicatively connected to a data store in which recipes, custom smoking patterns, and user appliance usage data are stored. The cloud computing platform 101 may be configured to access selected recipes from the data store and generate control signals for the electronically-controlled appliance according to the recipe. Indeed, the control signal generator 111 may generate control instructions 119 based on a recipe, such that the food is smoked by the electronically-controlled appliance 120 according to a smoke pattern specified in the recipe.

In this manner, a user can simply load a recipe on his or her mobile computing device 113 and provide that recipe to the cloud computing platform 101 where the control signal generator 111 will automatically access the recipe, generate control instructions 119 and send them to the electronically-controlled appliance 120. The appliance's hardware controller will then receive the control instructions, interpret them and carry them out. Accordingly, as a result of the control instructions, the grill/smoker may ignite and begin a smoking cycle, a timer may be set, alerts may be established and other fuel may begin to be fed into the combustion area. As such, multiple physical and computer-related results may occur based on the user's input at the mobile computing device 113. At least in some cases, these control instructions 119 may be overridden by the manual controls (603 of FIG. 6) or by the electronic controls 604.

In some embodiments, the cloud computing platform 101 may be configured to access user appliance usage data from a data store. The cloud computing platform 101 may then use this usage data to generate advertisements 123 for the appliance user based on the appliance usage data, and further transmit the generated advertisements to the electronically-controlled appliance 120 or to a software application 114 running on the user's mobile computing device 113. The advertisements may be tailored to the user, or may be general announcements that may be of interest to owners of that appliance.

Accordingly, methods, systems and computer program products are provided which communicate with and control operation of electronically-controlled appliances. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A cloud computing platform for communicating with and controlling operation of a wood-pellet grill comprising a hopper having an auger and for loading combustible pellets into a combustion area of the wood-pellet grill, the cloud computing platform comprising:
    at least one processor; and
    at least one non-transitory computer-readable storage medium storing instructions thereon that, when executed by the at least one processor, cause the cloud computing platform to:
        receive a first indication that the wood-pellet grill is in network communication with the cloud computing platform;
        generate one or more notifications indicating that the cloud computing platform is in network communication with the cloud computing platform to a remote device;
        transmit at least one generated notification of the one or more notification to the remote device;
        receive a second indication from the remote device that one or more specified functions are to be performed by the wood-pellet grill;
        transmit one or more instructions to the wood-pellet grill to perform the one or more specified functions;
        establish a connection with at least one third-party system;
        receive usage data from the wood-pellet grill, the usage data comprising at least one of digital probe information, food item temperature information, grill temperature information, cooking cycle usage information, fuel burn rate information, ambient temperature information, duration of use information, amount of power drawn from components of the wood-pellet grill, recipe usage data, alert information, ignition data, power off data, component failure data, cooking time data; and
        transmit at least a portion of the received usage data or information derived from the received usage data to at least one third-party system.

2. The cloud computing platform of claim 1, further comprising instructions that, when executed by the at least one processor, cause the cloud computing platform to transmit data input at the remote device to the at least one third-party system.

3. The cloud computing platform of claim 1, further comprising instructions that, when executed by the at least one processor, cause the cloud computing platform to transmit information related to a user input received at the remote device to the at least one third-party system.

4. The cloud computing platform of claim 1, wherein the at least one third-party system comprises a third-party advertisement system.

5. The cloud computing platform of claim 4, further comprising instructions that, when executed by the at least one processor, cause the cloud computing platform to:
   receive, from the third-party advertisement system, a customized advertisement based on the usage data transmitted to the third-party advertisement system; and
   transmit the customized advertisement to the wood-pellet grill.

6. The cloud computing platform of claim 1, wherein the at least one third-party system comprises one or more of a social media network, an eCommerce service, a customer service assistance service, or a third-party advertising system.

7. The cloud computing platform of claim 6, further comprising instructions that, when executed by the at least one processor, cause the cloud computing platform to:
   receive one or more instructions regarding communication with the at least one third-party system; and
   in response to receiving the one or more instructions regarding communication with the at least one third-party system, transmit particular information derived from the usage data to the at least one third-party system.

8. The cloud computing platform of claim 7, wherein the at least one third-party system comprises a social media network, and wherein the particular information derived from the usage data comprises one or more of an indication of use of a recipe with the wood-pellet grill, an estimated completion time of a cooking cycle of the wood-pellet grill, or an indication of a particular meat being cooked within the wood-pellet grill.

9. The cloud computing platform of claim 7, wherein the at least one third-party system comprises a global data storage.

10. The cloud computing platform of claim 1, wherein the at least one third-party system comprises one or more of an analytics system or a remote diagnostics system.

11. A cloud computing platform for communicating with and controlling operation of a wood-pellet grill comprising a hopper having an auger and for loading combustible pellets into a combustion area of the wood-pellet grill, the cloud computing platform comprising:
   at least one processor; and
   at least one non-transitory computer-readable storage medium storing instructions thereon that, when executed by the at least one processor, cause the cloud computing platform to:
      receive an indication that the wood-pellet grill is in network communication with the cloud computing platform;
      establish a connection with at least one third-party system remote from the wood-pellet grill and the cloud computing platform;
      receive usage data from the wood-pellet grill, the usage data comprising at least one of digital probe information, food item temperature information, grill temperature information, cooking cycle usage information, fuel burn rate information, ambient temperature information, duration of use information, amount of power drawn from components of the wood-pellet grill, recipe usage data, alert information, ignition data, power off data, component failure data, cooking time data; and
      transmit at least a portion of the received usage data to at least one third-party system.

12. The cloud computing platform of claim 11, wherein the at least one third-party system comprises one or more of a social media network, an eCommerce service, a customer service assistance service, a third-party advertising system, or a global data storage.

13. The cloud computing platform of claim 11, further comprising instructions that, when executed by the at least one processor, cause the cloud computing platform to:
   receive one or more instructions regarding communication with the at least one third-party system; and
   in response to receiving the one or more instructions regarding communication with the at least one third-party system, transmit particular information derived from the received usage data to the at least one third-party system.

14. The cloud computing platform of claim 13, wherein the at least one third-party system comprises a social media network, and wherein particular usage data comprises one or more of an indication of use of a recipe with the wood-pellet grill, an estimated completion time of a cooking cycle of the wood-pellet grill, or an indication of a particular meat being cooked within the wood-pellet grill.

15. The cloud computing platform of claim 13, further comprising instructions that, when executed by the at least one processor, cause the cloud computing platform to transmit data input at a remote device.

16. The cloud computing platform of claim 15, wherein the data input at the remote device comprises a media item comprising one or more of a photo, a recipe, a video, a location, an update from the wood-pellet grill, or information related to a user experience with the wood-pellet grill.

* * * * *